Feb. 13, 1934. H. A. WADMAN Re. 19,074

WOVEN WIRE CONVEYER BELT

Original Filed May 3, 1932

Witness;
H. B. Thayer

Inventor;
Harold A. Wadman
by Brown & Coburn
Attorneys.

Reissued Feb. 13, 1934

Re. 19,074

UNITED STATES PATENT OFFICE 19,074

WOVEN WIRE CONVEYER BELT

Harold A. Wadman, West Hartford, Conn., assignor to Hartford-Empire Company, Hartford, Conn., a corporation of Delaware Original No. 1,880,537, dated October 4, 1932, Serial No. 608,964, May 3, 1932. Application for reissue October 21, 1933. Serial No. 694,621

7 Claims. (Cl. 198—193)

This invention relates to woven wire conveyers, or conveyer belts, of the type which are particularly useful in conveying glassware through annealing lehrs. This use of conveyers of this general type is illustrated and described in the patents to Mulholland 1,560,481, granted Nov. 3, 1925, and Ingle 1,583,046, granted May 4, 1926.

In the use of woven wire conveyers of the type disclosed in the Mulholland and Ingle patents it has been found that several difficulties arise, first, due to the use of substantially helical wound wire for making up the conveyers, there is a tendency incident to a change of direction of the conveyer for lateral creeping, probably due to the "corkscrewing" action between contiguous transverse helical wires. In the past this creeping action has been compensated for by the use of panels or sections of right hand wound wires arranged alternately with panels or sections of left hand wound wires, the sections being suitably connected at the joints. The purpose of this construction was to produce a creeping action in one direction exactly compensating for the creeping action in the other direction, the panels being of such length that excessive creeping action was avoided, although this action was still material.

One of the objects of the present invention is to provide a belt wherein this lateral creeping action is reduced substantially to zero by the use of single wire sections so that there is a negligible creeping action in either direction, thus providing a belt which will travel in substantially a given unchanging path.

A further difficulty which has been experienced in the past with the use of conveyer belts as used in the Mulholland and Ingle patents, is that at the lateral sides of the belts at the joints between right and left hand wound wire sections there is a tendency for the belt to warp or be bowed out of the desired plane of the course of travel thereof. In practice it has been found that a more or less triangular portion of the belt, substantially in the form of an isosceles triangle, the base of which is on the lateral side of the belt and the altitude is on the line of connection between right and left hand wound sections, will bend up at one side of the belt and down at the other between the right and left hand wound sections and in the next adjacent joint along the belt the reverse action will take place. The theory of this warping or bending out of the proper place of the belt is not clearly understood, but has been variously attributed to the line of angular engagement between the connector wires or members and the right and/or left hand wound wire sections, or to the angle of engagement between the wires of the right and/or left hand wound wire sections with each other, or possibly to the direction of the main tensile stresses upon the belt in the upper and lower planes thereof which, of course, are along lines diagonal of the belt in one direction in the right hand wound sections on one side and in another direction in the left hand wound sections on the same side. Whatever may be the proper explanation of this phenomenon, the fact remains that it is extremely undesirable in lehr conveyer belts for the reason that a portion which warps or bends upwardly from the plane of the belt is an unstable supporting surface upon which articles having small bottom portions may not be placed without danger of toppling and which therefore render the belt less efficient in use. On the other hand, the existence of a portion of the belt which tends to warp or bend downwardly out of the normal plane of the belt causes an upward buckling of the adjacent portions of the belt when it is traveling over a plane surface, as it does through the lehrs of the type disclosed in the Mulholland and Ingle patents above referred to. This causes an unstable and non-horizontal supporting surface for the ware with the disadvantage above referred to, and in addition causes excessive wear of the downwardly warped portion of the belt which contacts with the supporting surface over which the belt is normally adapted to slide. As soon as this wear has gone far enough to sever the wire connections or loops of the wire, a tear starts which renders the belt unserviceable, to an extent at least, and eventually requires that it be removed and repaired, or wholly or partially replaced.

Another object of the present invention is, therefore, to provide a novel belt wherein this tendency for any portions thereof to warp or bend out of the normal plane of the belt will be reduced to a negligible amount, thus providing a belt having an even supporting surface, all of which is useful to equal advantage with small bottomed ware and also to provide a belt having a much longer life, as a result of more even wear, than those of the prior art. This can be, and is, by the present invention accomplished in practice by the use of single right and left hand wound wires connected by suitable connecting means, whereby the tendency for warping or otherwise bending out of the normal plane is negligible or substantially so.

Another difficulty which has arisen in the use of the prior art belts is that the ware-supporting surface of the body of any one section of the prior art belts may be considered as comprising a series of parallel lines diagonal to the course of the belt. As a result, when the prior art belts are used in conveying articles having relatively narrow bottoms, such, for example, as flat panel bottles, and when these articles are placed on the belt with the longer axes of their bottoms respectively substantially parallel to the lines of the ware-supporting surface of the belt, there has been great danger of toppling of the articles, at least those which are placed intermediate the ends of a single section of right or left-hand wound wires.

A further object, therefore, of the present invention is the provision of a belt wherein the lines of support for the articles include substantial changes in direction or angles at relatively short intervals, preferably at least one such change for every four contiguous wires making up the belt. It has been found in practice that a belt constructed in accordance with the present invention is effective to support panel bottles of the type just referred to with a minimum of trouble due to the toppling of the articles.

Other objects and advantages of the present invention will become apparent from a reading of the following specification and sub-joined claims. when taken in connection with the accompanying drawing, in which:

Figure 1:
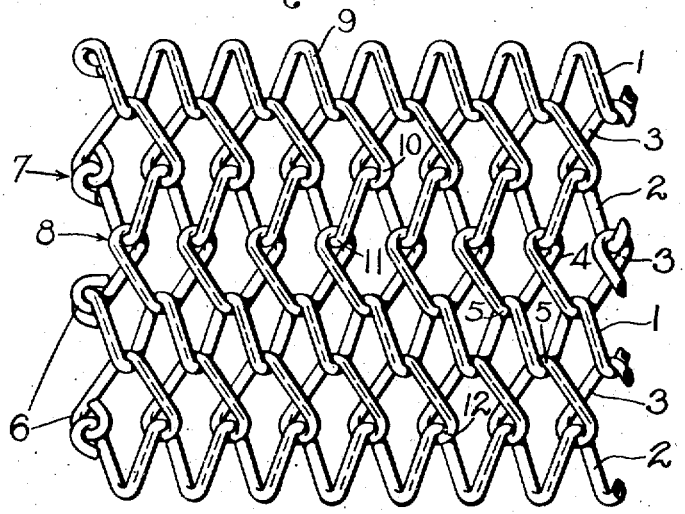
Figure 1 is a plan view of a portion of a conveyer belt constructed according to my present invention.
Figure 2:
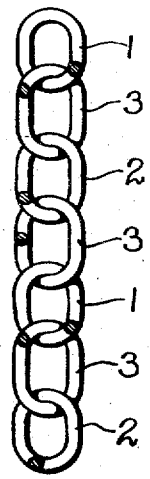
Fig. 2 is a side view of the conveyer belt portion of Fig. 1 as seen from the right hand side thereof.

Referring to Figs. 1 and 2 which illustrate a conveyer belt constructed according to my present invention, there is shown right hand wound wire sections 1, and left hand wound wire sections 2, each comprising single wires, which are connected by connecting wires 3. The connecting wires 3 are formed with small loops 4 on one side, each engaging a turn of the left hand wound wire sections 2 and large loops 5 on the other side, each of which engages a turn of the adjacent right hand wound wire section 1. The several wires 1, 2 and 3 making up the belt are connected at the lateral edges thereof, as shown at 6, by forming a loop on the connecting wires 3 engaging a loop on the adjacent right or left hand wound wire. These connections 6 at the edges are arranged in lateral alignment with the joint between the connecting wire 3 and the associated substantially helical wound wire with which it is engaged, thus facilitating the change of direction of the belt.

Due to the fact that only a single wire of right or left hand wound type is employed between the connecting wires and that these wires are arranged, first a right hand wound wire, then a connecting wire, then a left hand wound wire, then another connecting wire, etc., it will be seen that the tendency for lateral creeping incident to the change of direction of the belt will be substantially zero and also that the tendency for warping out of the normal plane of the belt adjacent to the edge at a connection between a right and left hand wound wire will be reduced substantially to zero, as this tendency which may be up to the point 7 will be offset by an equal and opposite tendency at the point 8, and so on along the belt. This neutralizing of the tendency to warp out of the normal plane of the belt will exist irrespective of which of the above suggested explanations of this tendency is the right one, or irrespective of whether any of them is correct. It has been found, for example, that a belt constructed in accordance with the present invention has the several advantages and lacks the disadvantages of prior art conveyer belts as above set forth.

In the accompanying drawing, the lines of support for the ware on the belt are indicated by the broken dash lines, one of which is denoted 9 (Fig. 1). Following down the line 9, it will be seen that there is a substantial angle or change in direction at the point 10, another change in direction or angle at the point 11, and a still further angle or change in direction at the point 12. Inasmuch as the portion of the belt shown in Fig. 1 constitutes more than a single unit, of which the belt may be considered as made up, it will be seen that there is no place in the belt where the lines of support do not contain at least one substantial angle or change in direction for any four contiguous wires. The maximum length of the substantially straight line of the ware-supporting surface of the belt is for a three wire section, as indicated from the point 11 to the point 12.

Also, the belt may be considered as made up of a plurality of sections including a pair of connecting wires 3 between which is arranged a right-hand wound wire 1, and with one of the connecting wires 3 is engaged a left-hand wound wire 2. These units or sections may be duplicated as often as necessary to make up a belt of the desired length.

Figure 3:
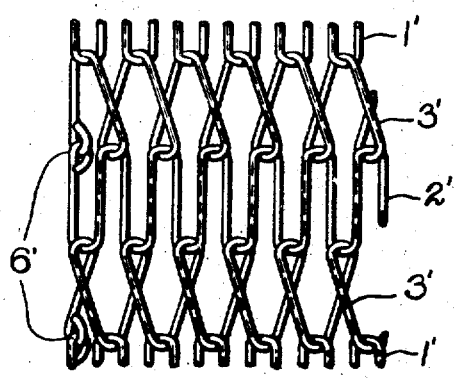
Fig. 3 is a view similar to Fig. 1 showing a different form of conveyer belt.
Figure 4:
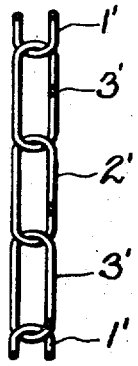
Fig. 4 is a side view of the conveyer belt portion of Fig. 3 similar to the showing of Fig. 2.

Referring now to Figs. 3 and 4, there is shown right hand wound wires 1′ and a left hand wound wire 2′ connected by connecting wires 3′, the form of these wires being somewhat different from that of the corresponding wires of Figs. 1 and 2 but their arrangement and functions being substantially the same as above described. The ends of these wires are connected at 6′, as above described for the connection 6 at the edges of the belt in Fig. 1.

As will be obvious from the drawing, considering both embodiments of my invention, the belt as a whole has a substantially uniform thickness both at the right and left hand wires and at the joints therebetween, so as to be equally effective in supporting ware at all portions of its surface. Furthermore, the provision of connecting wires, each having a plurality of similar curved portions each of which engage a loop of a right hand wound wire and a loop of a left hand wound wire, positively precludes any relative movement of the several wires in a direction laterally of the belt. This result may also be obtained by the edge connections illustrated at 6, even though straight wire connectors be used. These two features, which are inherent in the belt disclosed herein, are very important in practice in that they inhibit many of the troubles found in other types of commercial belts.

Certain other changes or modifications might be made without departing from the spirit of this invention. I do not wish to be limited, therefore, except by the appended claims, which are to be construed as broadly as the state of the prior art permits.

I claim:

1. A woven wire conveyer, comprising alternately arranged transversely disposed substantially helical right and left hand wound wires, connecting wires interposed between and meshing with each turn of the first named wires and so formed and arranged that when the conveyer is assembled for use, it presents a supporting surface for ware made up of portions of the turns of all of said wires and of such character that the lines of the ware-supporting surface for any four contiguous wires includes at least one substantial change in direction, whereby articles having relatively narrow bottoms may be supported on the conveyer without toppling.

2. A woven wire conveyer, composed of a plurality of transversely disposed wire sections, each of which is made up of a pair of similar connecting wires having sets of loops on each side thereof, the pitch of the loops on one side being in the opposite direction to the pitch of the loops on the other side, a single right hand wound substantially helical wire, the turns of which are engaged with one of the loops on the sides of each of said pair of connecting wires the pitch of which is in one direction, and a single left hand wound substantially helical wire, each turn of which is engaged with one of the loops on the other side of one of said pair of connecting wires, said connecting wires being formed co-extensive with the thickness of said conveyer when said sections are assembled, whereby all said wires have portions making up the ware-supporting surface of the conveyer and whereby the ware-supporting surface of the conveyer has lines of contact with the ware, which lines include at least one substantial angle for each four contiguous wires the better to support articles having relatively narrow bottoms.

3. A woven wire conveyer, comprising alternately arranged, transversely disposed, substantially helical, right and left hand wound single wires, connecting wires interposed therebetween and formed each of a single wire, having a plurality of similar curved portions, each of said curved portions having a part engaging a turn of a right hand wound wire and a part engaging a turn on a left hand wound wire, said connecting wires being of such form and proportion, in respect to the form and proportion of the right and left hand wound wires engaged thereby, that in the belt as a whole relative lateral movement of the several wires with respect to one another is prevented and the effective thickness of the belt is substantially uniform throughout and including the joints between adjacent right and left hand wound wires.

4. A woven wire conveyer, comprising alternately arranged, transversely disposed, substantially helical, right and left hand wound single wires, connecting wires interposed therebetween, said connecting wires having their ends each connected to one of said helical wires, and each of said end connections being in substantial alignment with the effective hinge line between said connecting wire and the helical wire to which the respective end of the connecting wire is connected, whereby relative lateral movement of the several wires in the belt as a whole is prevented, the several wires being so formed and arranged that the effective thickness of the belt is substantially uniform throughout, including the joints between the right and left hand wound wires.

5. A woven wire conveyer, comprising alternately arranged, transversely disposed, substantially helical, right and left hand wound single wires, connecting wires interposed therebetween and alternately engaging the several loops of the contiguous right and left hand wound wires, hinge-like connections at each end of the right and left hand wound wires at the lateral edges of the belt for maintaining the right and left hand wound wires against displacement laterally of the belt, said hinge-like connections being substantially in transverse alignment with the effective hinge lines between the respective right and left-hand wound wires and the contiguous connecting wires to provide longitudinal flexibility to the belt, and the several wires of which the belt is composed being so formed and arranged that the effective thickness of the belt is substantially uniform throughout, including the joints between the right and left-hand wound wires.

6. A woven wire conveyer comprising alternately arranged transversely disposed substantially helical right and left hand wound wires, connecting wires interposed between and engaging each turn of the first named wires, the several wires of the conveyer being so formed and arranged when the conveyer is assembled for use, it presents a supporting surface for ware comprising portions of the turns of the right and left hand wound wires and of such character that the lines of the ware-supporting surface for any four adjacent ware-supporting wires includes at least one substantial change in direction, each of the ware-supporting wires overlapping adjacent ware-supporting wires on either side thereof in a direction longitudinally of the belt, whereby articles having relatively narrow bottoms may be supported on the conveyer without toppling.

7. A woven wire conveyer, comprising alternately arranged transversely disposed substantially helical right and left hand wound wires, connecting means interposed between and engaging each turn of the first named wires, the several wires and connecting means being so formed and arranged that when the conveyer is assembled for use, it presents a supporting surface for ware comprising portions of the turns of the right and left hand wound wires, and of such character that the lines of the ware-supporting surface for any four adjacent ware-supporting wires includes at least one substantial change in direction and also that the space between ware-supporting portions of adjacent wires in a direction longitudinally of the belt is less than the dimensions of either the right or left hand wound wires measured in the same direction, whereby articles having relatively narrow bottoms may be supported at any position on the belt without toppling.

HAROLD A. WADMAN.